United States Patent Office 3,479,393
Patented Nov. 18, 1969

3,479,393
STABILIZED ORGANIC ISOCYANATE COMPOSITIONS
Robert L. Sandridge, Proctor, W. Va., assignor to Mobay Chemical Company, Pittsburgh, Pa., a corporation of Delaware
No Drawing. Filed Dec. 20, 1966, Ser. No. 603,095
Int. Cl. C07c *119/04, 87/04;* C08g *51/60*
U.S. Cl. 260—453          9 Claims

ABSTRACT OF THE DISCLOSURE

A stabilizing amount of a trialkylamine borane as a stabilizer against the discoloration of organic isocyanates.

---

This invention relates to organic compounds, and more particularly to the stabilization of organic isocyanates against discoloration.

Organic isocyanates, which in general are colorless liquids or solids, tend to become discolored on storage. On discoloration these organic isocyanates change from colorless to yellow to brown or black in extreme cases, and while this color can be removed by distilling the isocyanates, the distilled products again become discolored on standing even after only a few hours.

The discoloration of these organic isocyanates presents a serious problem where colorless or very light colored reaction products are to be produced since it is usually impractical to redistill the isocyanate immediately before use.

The exact cause of the color formation in isocyanates is not known. Isocyanates stored in tightly closed containers discolor practically as rapidly as those which are stored in air and aliphatic as well as aromatic isocyanates may discolor on storage or standing although aromatic isocyanates have a much greater tendency to discolor than do the aliphatic isocyanates. Whether it is light, air, moisture, temperature, pressure or any other factor or combination of factors which is responsible for the discoloration of isocyanates a simple and effective method for combatting this problem is imperative.

It is therefore an object of this invention to provide a means for combatting the discoloration of isocyanates.

It is a further object of this invention to provide a simple and positive method for stabilizing organic isocyanates against discoloration.

Still another object of this invention is to provide organic isocyanates which will not discolor even upon standing for extended periods of time in air and light.

The foregoing objects and others which will become apparent from the following description are accomplished in accordance with this invention, generally speaking, by providing as a stabilizer against the discoloration of organic isocyanates, a stabilizing amount of trialkylamine borane.

The trialkylamine boranes are soluble in the organic isocyanates which are normally liquids and they may be readily dissolved in melted organic isocyanates which are solids at normal temperatures. Although the amount of stabilizer generally employed will vary from about 0.001 to about 3% depending on the stabilizer used, it is preferred to use from about 0.01 to about 0.2% based on the weight of the isocyanates to be stabilized. Larger amounts of the stabilizers may be used up to the limit of their solubility in the isocyanate, but unnecessarily large amounts should be avoided since they would merely constitute an impurity and in some cases may be detrimental to the product. When the small amounts of the stabilibzer are used, the effect of the stabilizer as an impurity in the product is negligible.

The trialkylamine boranes to be added as stabilizers in accordance with this invention may be represented by the formula $H_3B:N(R)_3$, wherein R is an alkyl radical having from about 1 to about 4 carbon atoms in a chain or branched structure. It is preferred, however, to use a trialkylamine borane wherein the alkyl group R is a methyl group. Typical examples of some other suitable trialkylamine boranes are, for example, trimethylamine borane, triethylamine borane, tributylamine borane, isopropyldimethylamine borane, ethyldimethylamine borane, methylethylbutylamine borane, trisecondarybutylamine borane, triisobutylamine borane and the like and mixtures thereof. Any isocyanate or mixture of isocyanates which discolors or has a tendency to discolor may be stabilized against discoloration with the stabilizers of this invention. Some such isocyanates are, for example, aliphatic, cycloaliphatic, araliphatic, alkaryl or aromatic mono-, di and polyisocyanates including 4 - phenylbutylisocyanate, phenylisocyanate, o-, m-, or p-tolueneisocyanate, hexamethylisocyanate, cyclohexylisocyanate, phenylene diisocyanates, 2,4- and/or 2,6-toluylene diisocyanate, diphenylmethane diisocyanate and all the isomers thereof such as, for example, diphenylmethane-4,4'-diisocyanate, diphenylmethane-2,4'-diisocyanate, diphenylmethane-2,2'-diisocyanate and mixtures thereof and the like, 4,4'-bisphenylene diisocyanate, 1,5 - naphthalene diisocyanate, hexamethylene diisocyanate, 3-phenylhexamethylene-1,6-diisocyanate, decamethylene diisocyanate, ethylene diisocyanate, butylene diisocyanate, dipropyldiisocyanato ether, 2,2-dimethylpentylene diisocyanate, 3 - methoxyhexamethylene diisocyanate, 1,4-butylene glycol propylether diisocyanate, cyclohexylene diisocyanate, undecamethylene diisocyanate, dodecamethylene diisocyanate, 1,3-dimethylbenzene diisocyanate, 1,4 - dimethylbenzene diisocyanate, 1,2-dimethylcyclohexane diisocyanate, 1,4-diethylbenzene diisocyanate, 1,4-dimethylnaphthalene diisocyanate, 1,5-dimethylnaphthalene diisocyanate, carbodiimides with free terminal NCO groups, e.g., from polyisocyanates including diisocyanates with catalysts such as phosphine oxides, 1-methylbenzyl-2, 4,6-triisocyanate, 1,3,5-trimethylbenzyl-2,4,6-triisocyanate, 3 - phenylhexylene-2,4,6-triisocyanate, naphthalene-1,3,7 - triisocyanate, 3 - methyldiphenylmethane-4,6,4-triisocyanate, 4,4' - dimethyldiphenylmethane - 2,2',5,5' - tetraisocyanate, triphenylmethane-4,4',4''-triisocyanate, 1,3,5 - triisocyanato hexane, 1,3,5-triisocyanatocyclohexane and the like and mixtures thereof.

Further, any suitable polymeric isocyanate may be treated in accordance with this invention. Some such suitable polymeric isocyanates include, for example, dimers and trimers including dimers and trimers of any of the foregoing isocyanates containing free NCO groups, biuret polyisocyanates such as those disclosed in U.S. Patent 3,124,605, the adduct of an organic compound containing at least two reactive hydrogen atoms as determined by thhe Zerewitinoff method and an excess of organic polyisocyanate such as, for example, the reaction product of any of the isocyanates mentioned herein and active hydrogen containing compounds such as, for example, hydroxyl polyesters, polyhydric polyalkylene ethers, polyhydric polythioethers, polyacetals, aliphatic polyols, including alkane, alkene and alkyne diols, triols, tetrols and the like, aliphatic thiols including alkane, alkene and alkyne thiols having two or more —SH groups; polyamines including aromatic, aliphatic and heterocyclic diamines, triamines, tetramines and the like; as well as mixtures thereof. Compounds which contain two or more different groups within the above-defined classes may also be used in the preparation of the isocyanate, including, for example, amino alcohols which contain an amino group and an hydroxyl group, amino alcohols which contain two amino groups and one hydroxyl group and the like. Also compounds may be used which contain one —SH group and one —OH group or two —OH groups and one —SH group as well as those which contain an amino group and an —SH group and the like. Further examples of isocyanates which may be stabilized as outlined herein may be found in U.S. Reissue 24,514 and German patent specifications 1,072,385, 1,022,789 and 1,027,394.

Although theoretically aliphatic isocyanates should be resistant to discoloration, it has been found as a practical matter that aliphatic isocyanates do have a tendency to discolor and that in some cases it is impossible to keep them color-free. The amine boranes of this invention have also been found to be suitable in the stabilization of such isocyanates against discoloration. In addition to those isocyanates already mentioned which fall into this classification, the stabilizers of this invention are especially useful in stabilizing hydrogenated tolylene diisocyanate, 4,4'-diphenylmethane diisocyanate and the like isocyanates including any of the foregoing isocyanates which have been hydrogenated or are aliphatic.

The invention is further illustrated by the following examples in which all parts and percentages are by weight unless otherwise specified.

Example 1

4,4'-diphenylmethane diisocyanate is distilled under reduced pressure and about 30 parts of the essentially colorless isocyanate is placed into each of three 2 ounce bottles. Trimethylamine borane is added to one bottle at a concentration of about 0.1% and to the other at about 0.5%. The third bottle is a control having no stabilizer added. The bottles are tightly capped and stored at about 44° C. in a circulating oven for observation. The color of the isocyanate after about 35 days of standing is determined by the Gardner scale according to ASTM method D154–53. The Gardner values indicate depth and darkness of color and as the Gardner color value increases, it indicates increasing color.

The Gardner color of the control was found to be greater than 7, while both of the stabilized samples had a Gardner color of about 1.

Example 2

An isomeric mixture of about 80% 2,4-tolylene diisocyanate and about 20% 2,6-tolylene diisocyanate is distilled under a vacuum of about 4 to about 5 mm. of mercury. About 20 parts of the distilled isocyanate which is substantially colorless is placed into each of 5 open bottles. The first bottle is a control and contained no stabilizer. To the second bottle is added about 0.01 percent of triethylamine borane; to the third bottle is added about 3 percent of triethylamine borane; to the fourth bottle is added about 0.001 percent of triethylamine borane and to the fifth bottle is added about 0.2 percent of triethylamine borane.

The five bottles are placed in the open air at room temperature and in sunlight with the lids placed on loosely. During the experiment, the relative humidity varies from about 50 at room temperature which is the usual level under ordinary conditions to about 93 percent because of an extended period of rainy weather. The examples are examined, again using the Gardner scale, and the results are tabulated below:

| Sample | 1 | 2 | 3 | 4 | 5 |
|---|---|---|---|---|---|
| Concentration of triethylamine borane | 1 | 0.01 | 3 | 0.001 | 0.2 |
| Gardner color | >7 | (1) | 2 | 1 | (1) |

[1] Water white.

Example 3

An isomeric mixture of about 80 percent 2,4- and about 20 percent 2,6-hydrogenated tolylene diisocyanate is distilled. About 20 parts of the distillate is placed into each of three bottles. The first bottle contains no stabilizer and is used as a control. The second bottle contains about 0.1 percent of trimethylamine borane, and the third bottle contains about 0.5 percent of trimethylamine borane. Into each of the two additional bottles about 20 parts of hexamethylene diisocyanate are placed. To the first of these bottles is added about 0.1 percent of tributylamine borane and to the second bottle is added about 0.5 percent of tributylamine borane. The bottles are loosely stoppered and stored at about 44° C. in a circulating air oven for about 30 days. The Gardner color of the samples at the end of that time is tabulated below:

| Sample | 1 | 2 | 3 | 4 | 5 |
|---|---|---|---|---|---|
| Concentration | Control | 0.1 | 0.5 | 0.1 | 0.5 |
| Gardner color | >4 | 1 | 1 | 1 | 1 |

Although the invention has been described in considerable detail in the foregoing examples, it is to be understood that such detail is solely for the purpose of illustration and that any of the trialkylamine borane compounds may be used in any of the foregoing examples with any isocyanate, and especially those disclosed hereinbefore. Thus variations and modifications may be made by one skilled in the art without departing from the spirit and scope of the invention.

What is claimed is:

1. A stabilized organic isocyanate composition stabilized against discoloration comprising an organic isocyanate having dissolved therein a stabilizing amount of a trialkylamine borane having the formula $$H_3B:N(R)_3$$

wherein R is an alkyl radical having from 1 to 4 carbon atoms.

2. The stabilized isocyanate composition of claim 1 wherein the trialkylamine borane is present in an amount of from about 0.001 to about 3 percent by weight based on the isocyanate.

3. The stabilized isocyanate composition of claim 1 wherein the isocyanate is selected from the group consisting of diphenylmethane diisocyanate and a mixture of the isomers of diphenylmethane diisocyanate.

4. The stabilized isocyanate composition of claim 1 wherein the isocyanate is tolylene diisocyanate.

5. The stabilized isocyanate composition of claim 1 wherein the isocyanate is hydrogenated tolylene diisocyanate.

6. The stabilized isocyanate composition of claim 1 wherein the trialkylamine borane is trimethylamine borane.

7. The stabilized isocyanate composition of claim 1 wherein the trialkylamine borane is triethylamine borane.

8. The stabilized isocyanate composition of claim 1 wherein the trialkylamine borane is tributylamine borane.

9. The stabilized isocyanate composition of claim 1 wherein the trialkylamine borane is tripropylamine borane.

References Cited

FOREIGN PATENTS 638,223  3/1962  Canada.

CHARLES B. PARKER, Primary Examiner

D. H. TORRENCE, Assistant Examiner

U.S. Cl. X.R.

260—2.5, 45.9, 77.5, 239, 248, 583